United States Patent [19]
Hodges et al.

[11] Patent Number: 5,787,304
[45] Date of Patent: Jul. 28, 1998

[54] MULTIPATH I/O STORAGE SYSTEMS WITH MULTIPATH I/O REQUEST MECHANISMS

[75] Inventors: Paul Hodges, San Jose; Michael Garwood Hurley, Cupertino; Norman Kenneth Ouchi, San Jose; Mien Shih, Saratoga, all of Calif.

[73] Assignee: International Business Machines Corporation, Armonk, N.Y.

[21] Appl. No.: 597,092

[22] Filed: Feb. 5, 1996

[51] Int. Cl.⁶ .................................................. G06F 13/00
[52] U.S. Cl. ...................................................... 395/821
[58] Field of Search ........................ 395/200.08, 681, 395/821, 825, 835–839, 840–41, 858, 874

[56] References Cited

U.S. PATENT DOCUMENTS

| | | | |
|---|---|---|---|
| 3,500,333 | 3/1970 | Couler et al. | 395/839 |
| 4,187,538 | 2/1980 | Douglas et al. | 364/200 |
| 4,484,262 | 11/1984 | Sullivan et al. | 364/200 |
| 4,577,272 | 3/1986 | Ballew et al. | 364/200 |
| 4,707,781 | 11/1987 | Sullivan et al. | 364/200 |
| 4,888,691 | 12/1989 | George et al. | 395/182.13 |
| 4,920,538 | 4/1990 | Chan et al. | 364/200 |
| 5,038,275 | 8/1991 | Dujari et al. | 395/839 |
| 5,072,368 | 12/1991 | Foreman et al. | 395/575 |
| 5,201,053 | 4/1993 | Benhase et al. | 395/725 |
| 5,226,150 | 7/1993 | Callander et al. | 395/575 |
| 5,230,048 | 7/1993 | Moy | 395/600 |
| 5,276,861 | 1/1994 | Howarth | 395/575 |
| 5,325,510 | 6/1994 | Frazier | 395/425 |
| 5,325,536 | 6/1994 | Chang et al. | 395/736 |
| 5,333,265 | 7/1994 | Orimo et al. | 395/200 |
| 5,333,301 | 7/1994 | Cheney et al. | 395/185.09 |
| 5,335,324 | 8/1994 | Orimo et al. | 395/200 |
| 5,339,449 | 8/1994 | Karger et al. | 395/826 |
| 5,418,909 | 5/1995 | Jackowski et al. | 395/835 |
| 5,509,136 | 4/1996 | Korekata et al. | 395/478 |
| 5,530,740 | 6/1996 | Irribarren et al. | 379/89 |
| 5,574,863 | 11/1996 | Nelson et al. | 395/200.08 |
| 5,640,596 | 6/1997 | Takamoto et al. | 395/841 |

*Primary Examiner*—Lance Leonard Barry
*Attorney, Agent, or Firm*—Paik Saber

[57] ABSTRACT

A data processing system having multiple independent paths for communication between a host and a plurality of storage devices where each path has its own queue for servicing requests generated by the host for accessing the storage devices. Each request is assigned a unique sequential ID before it is stored, along with its unique ID, in all the queues. Each storage device has a "mailbox" register where the ID and the status of the latest request being carried out is stored. Queues are serviced and their status updated based on the content of the mailbox in each storage device. The combination of assigning a unique task ID to each request and a "mailbox" register in each storage device allows the queue in each path to be completely out of sync with each of the queues in the other paths without causing data integrity problems, duplication of requests at the device level, or a need for complex locking schemes to keep the queues in sync with each other.

11 Claims, 10 Drawing Sheets

EIGHT-BYTE FIELD IN DEVICE BUFFER

MULTIPATH I/O STORAGE SYSTEMS WITH MULTIPATH I/O REQUEST MECHANISMS

BACKGROUND OF THE INVENTION

1. Technical Field

This invention relates to a data processing system having multiple independent paths for communication between multiple independent storage controllers and storage devices. Specifically, this invention relates to a method and means for efficient management of the queues in a multiple independent path storage subsystem where the requests for accessing the storage devices can be carried out without the need for the queues to be in sync with each other.

2. Description of the Background Art

Data processing systems (systems) with multiple input/output (I/O) storage subsystems generally have multiple independent communication paths between the processor and each storage device in the system. A typical data processing system 100 having such a feature is shown in FIG. 1. Host 110 generally comprises an application program 112, operating system 114, and an I/O supervisor 116 where the I/O supervisor further includes a host task queue 117 for managing the requests issued by the host. Host 110 further comprises a plurality of I/O channels 118 for communication with storage controller 120. Storage controller 120 generally comprises a plurality of I/O ports 122 for communication with host 110, a shared cache 124 for high performance, and a plurality of controller paths 130 for accessing storage devices 140. Storage controller 120 and storage devices 140 are generally referred to as a storage subsystem.

In general, if an I/O request issued by host 110 cannot be satisfied by information already stored in cache 124, storage controller 120 will access the appropriate storage device via one of the available controller paths 130 to carry out the I/O request. The data processing system of FIG. 1 in general provides high availability due to redundancy of the storage subsystem, multiple I/O channels, multiple controller paths in the storage controller, and multiple communication links between the storage controller and the storage devices.

In this type of system, a typical queuing of an I/O request issued by host 110 is carried out as follows: I/O request is initiated by application program 112 and passed to I/O supervisor 116. I/O supervisor 116 receives and adds the request to host task queue 117 which is maintained by the I/O supervisor. When one of the communication links 150 becomes available, I/O supervisor 116 initiates an I/O process for the first request in the queue 117 for which the corresponding device is available.

In this type of system, since host task queue 117 is the only queue of I/O operation available in the system, all operations are initiated at host 110 and only one operation can be active for any device. Furthermore, that operation must be reported as complete before another operation for that device can be initiated by I/O supervisor 116.

In this type of architecture, failure of one of the channels 118, communication links 150, device communication links 160 or controller paths 130 does not prevent access to storage devices, but a failure that affects host task queue 117 will cause requests in host task queue 117 to fail and is likely to cause one or more programs to abort. Recovery from failure may involve reexecuting the program on the same host or on a different host system.

However, in a data system where the storage controller has a cache, it is desirable that operations between cache 124 and storage devices 140 be performed concurrently with operations between cache 124 and host (also referred to as central processing unit (CPU)) 110. For example, a request to write data to storage device 142 issued by host 110 can be considered complete by host 110 when the data has been transferred to cache 124. After that, subsequent operations for device 142 can be executed from cache 124 while the updated data is written into storage device 142.

An example of a data system where the storage controller has a cache is shown in FIG. 2. FIG. 2 represents an IBM System/390 (host 110) in communication with IBM storage controller 3990 (storage controller 120) which controls the operation of IBM magnetic storage devices 3390 (storage devices 140). In this system, there are four communication paths (data paths) between storage controller 120 and storage devices 140. Each data path comprises a controller path 130 and a device communication link 160 and is available for carrying instructions to perform operations on any of the storage devices 140.

In order to provide high availability, storage controller 120 is generally divided into two storage sub-controllers 132 and 134. Storage sub-controller 132 comprises a controller task queue 126 and a plurality of controller paths 130 (two controller paths shown in FIG. 2). Storage sub-controller 134 comprises a controller task queue 128 and a plurality of controller paths 130 (two controller paths shown in FIG. 2). Task queues 126 and 128 are replicas of each other. Furthermore, the two storage sub-controllers are designed to be at different power boundaries to improve overall system reliability. Therefore, if one of the storage sub-controllers fails, the other storage sub-controller would continue to execute requests from its task queue thus providing continuous performance although at a reduced level.

Considering that each request for access to a storage device issued by host 110 may contain several sub-commands which any of the sub-commands may be initiated by one sub-controller and completed by another, the management of the task queues in storage controller 120 becomes an extremely serious and critical issue. For example, an I/O request usually contains two sub-commands, 1) a preparatory state command of "seek/locate" and 2) a time dependent data transfer command known as "read/write". In the case of this type of an I/O request, either one of the storage sub-controllers may be available to carry on any of the sub-commands at any given time and may indeed service the next operation on the queue.

Therefore, each storage sub-controller has to keep track of the state of the I/O request for each device to ensure that a read/write command is associated with the correct I/O request before it is carried out by either one of the sub-controllers. That is, there must be a mechanism by which acknowledgment of completion of the seek/locate sub-command is received by both sub-controllers. For example, execution of the read/write sub-command by either one of the sub-controllers might be delayed until both sub-controllers have received acknowledgment from the storage device. However, this approach would make access to storage devices extremely slow, and would also compromise the independence of the storage sub-controllers.

One way to address this problem is to ensure that the storage sub-controllers operate independently to ensure high availability yet communicate very closely with each other in processing device access requests to improve performance. Such an architecture is shown in FIG. 2 where a request for access to a storage device is replicated by each storage sub-controller and sent by each sub-controller to the device.

In this architecture, the first storage sub-controller acquiring the device and establishing a communication path transmits the seek/locate command to the device. The communication path is then disconnected from the device and the storage device begins executing the seek/locate sub-command. Once the operation is complete and the device is ready for data transfer, the device raises a flag or interrupt to inform the storage controller. Once the device raises a flag or interrupt, the first available sub-controller sensing the interrupt from the device acquires the device and completes the data transfer from the device to the shared cache 124 in storage controller 120.

Therefore, in this architecture, the storage sub-controllers operate independently to provide high availability yet cooperate very closely to ensure high performance. However, since the communication paths through each storage sub-controller are asynchronous, which means requests may be delayed through one communication path compared to another path, this can very well result in a storage sub-controller executing a request or a sub-command which has already been completed by the other storage sub-controller. This could easily lead to wasted operations which lowers overall storage subsystem performance and at the same time could cause data integrity problems.

A high speed message passing architecture may be utilized in the system of FIG. 2 between the storage sub-controllers to inform a sub-controller of the operations executed by the other sub-controller. But even sending messages from one sub-controller to another may be delayed leading to duplication of requests and data integrity problems.

Furthermore, since a plurality of communication paths exist between storage controller 120 and storage devices 140 and any one of the communication paths that are available may service the next I/O request from either one of the task queues 126 and 128, the two copies of the queues must be kept identical at all times to prevent executing the same I/O request twice. This means a sophisticated and complex locking scheme must be used to ensure that a sub-controller ready for work has exclusive access to both copies of the queues and that both copies of the queue are updated before the lock is released.

Therefore, while the two storage sub-controllers of storage controller 120 are intentionally independent with respect to hardware failures, the communication between the two sub-controllers is very critical to ensure queue integrity. The dependency on complex and elaborate locking schemes and high speed communication between the sub-controllers of the storage controller results in a slowing down of system performance and can lead to performance bottlenecks.

One way to eliminate such a bottleneck and dependency on complex locking schemes between the queues is to eliminate storage controller 120 and move the necessary function to each storage device. Such an architecture is shown in FIG. 3 in which a plurality of processors 210 and 212 are in communication with multiple storage devices 220 via a small computer system interface (SCSI) bus 218. In this architecture, each storage device 220 contains a device controller 224 and a storage medium 222. Each SCSI device controller 224 further comprises its own device task queue 226.

Maintaining a queue of work for a storage device at the device level itself is efficient from the queuing standpoint, but such a device requires additional hardware and software, and must have a sophisticated device controller. Although devices having sophisticated device controllers are available (SCSI devices), there is also a desire to have a simple storage device having no device controller that can be directly connected to a storage controller or a RAID controller or a network-attached data server without the problems associated with managing multiple queues at the storage controller.

Therefore, in a storage subsystem having a plurality of storage devices in communication with a storage controller via a plurality of independent I/O communication (data) paths, there is a need for a method and means for coordinating I/O requests maintained in multiple task queues and canceling completed operations among the independent communication paths without the need for keeping the task queues in the storage sub-controller in complete synchronization with each other, without the need to provide continuous status of each storage device and request between the storage sub-controllers, and without the need for high speed communications between the sub-controllers in an attempt to keep the queues in sync with each other.

Also, in a data processing system having a plurality of independent storage controllers in communication with storage devices via a plurality of independent I/O communication (data) paths, there is a need for a method and means for processing I/O requests maintained in multiple task queues in the controllers and canceling completed operations among the independent communication paths without the need for keeping the task queues in the controller in complete synchronization with each other, without the need to provide continuous status of each storage device and request between the storage controllers, and without the need for high speed communications between the storage controllers in an attempt to keep the queues in sync with each other.

SUMMARY OF THE INVENTION

It is an object of the present invention to provide a high performance storage subsystem having multiple independent paths for communication between a storage controller and storage devices.

It is a further object of the present invention to provide a high availability storage subsystem having multiple independent paths for communication between the storage controller and the storage devices.

It is another object of the present invention to provide a storage subsystem with multiple storage sub-controllers where the queue in each sub-controller need not be kept in sync with the queue in the other sub-controllers.

It is a further object of the present invention to provide a storage subsystem where the storage sub-controllers in each storage controller communicate with each other via a register at each storage device.

It is yet another object of the present invention to provide a storage subsystem where there is no requirement for complex locking schemes on queues in order to ensure that the queues are kept in sync with each other.

It is also another object of the present invention to provide a storage subsystem where the need for high speed communication between the storage sub-controllers to maintain queue integrity is eliminated.

It is still another object of the present invention to provide a storage subsystem where multi-command instructions can be initiated by one sub-controller and completed by another sub-controller without the need for keeping the queue in each storage sub-controller in sync with the queue in the other storage sub-controller.

It is an object of the present invention to provide a high performance data processing system having multiple independent paths for communication between a plurality of independent storage controllers and storage devices.

It is another object of the present invention to provide a data processing system with multiple storage controllers where the queue in each controller need not be kept in sync with the queue in the other controllers.

It is a further object of the present invention to provide a data processing system in which the storage controllers communicate with each other via a register at each storage device.

It is still another object of the present invention to provide a data processing system where multi-command instructions can be initiated by one storage controller and completed by another storage controller without the need for keeping the queue in each storage controller in sync with the queue in the other storage controller.

Toward this end and in accordance with the present invention, in a data processing system having multiple independent I/O paths between a storage controller and storage devices wherein the storage controller comprises a plurality of storage sub-controllers and wherein each storage sub-controller comprises a task queue (queue), a method and means are disclosed wherein the status of each queue and the I/O request (job) completed or in progress are communicated to the other queues via a register that is maintained at each storage device. This is done by:

(1) assigning a unique identifier to each I/O request before the request is stored in the queues. The unique identifier for each I/O request stored in the queues will ensure that an I/O request is removed from all copies of the queues when that request is completed through any one of the storage sub-controllers;

(2) maintaining a register known as a "mailbox" in each storage device which can be read and/or written to by any sub-controller that establishes a communication path with that device. The mailbox contains the unique identifier and the status of the last I/O request executed or the I/O request currently being executed by that device; and (3) allowing any of the storage sub-controllers to read the content of the mailbox and take the appropriate action depending on the content of the mailbox.

The appropriate action taken by a storage sub-controller reading the mailbox of a device may result in changing the status of the storage device and updating the mailbox content to reflect the change in the status. The sub-controller reading the mailbox may also update its copy of the queue on the basis of what it just read.

Therefore, based on the disclosed invention, the copies of the queues are not necessarily in sync with each other. Indeed, the queues could be completely out of sync with each other without causing any duplication of work, data integrity problems, or slowing down the processing of the I/O requests.

For example, if a request to read data from storage device A is issued by the host, the request is assigned a unique label x by the storage controller before the request is stored in the task queues. Once device A becomes available, the request for access to device A is dispatched through all available communication paths. If path 1 is the first to acquire device A, it issues the seek/locate command to prepare the device for data transfer. Device A then stores the unique label x in its mailbox and sets the state of I/O operation to show that device A has been issued the command to prepare itself for data transfer. Path 1 then releases device A and carries out other operations while device A is preparing itself for data transfer. Assuming that path 2 is the first path to sense that device A is ready for data transfer, path 2 reads device A mailbox to find out that the request with unique label x is in progress, associates the data transfer with the request labeled x in its task queue, and then executes the data transfer. Once the data transfer is completed, the state of that specific I/O request at device A is set to complete to reflect that the request associated with the unique label x has been carried out. Assuming that path 1 now attempts to read device A, once it reads device A's mailbox it will find out that the request associated with unique label x has already been completed through another path. So, path 1 deletes the request associated with unique label x from its own task queue and then releases device A.

Using a unique label for each I/O request stored in the task queues in conjunction with a mailbox at each storage device prevents the same request from being executed more than once by the storage sub-controllers. At the same time, it allows the task queues to be updated asynchronously without affecting the performance of a storage system. Furthermore, using a unique label for each I/O request in conjunction with a mailbox at each storage device eliminates the need for having sophisticated and complex lock step schemes to ensure that the task queue in each storage sub-controller is in sync with the task queues in the other storage sub-controllers. Using the present invention also eliminates the need for providing high speed direct communication between storage sub-controllers to quickly and continuously communicate the queues' status because task queues need not be in sync with each other.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the invention. This description and the number of alternative embodiments shown are made for the purpose of illustrating the general principle of the present invention and is not meant to limit the inventive concepts claimed herein.

Figure 4:
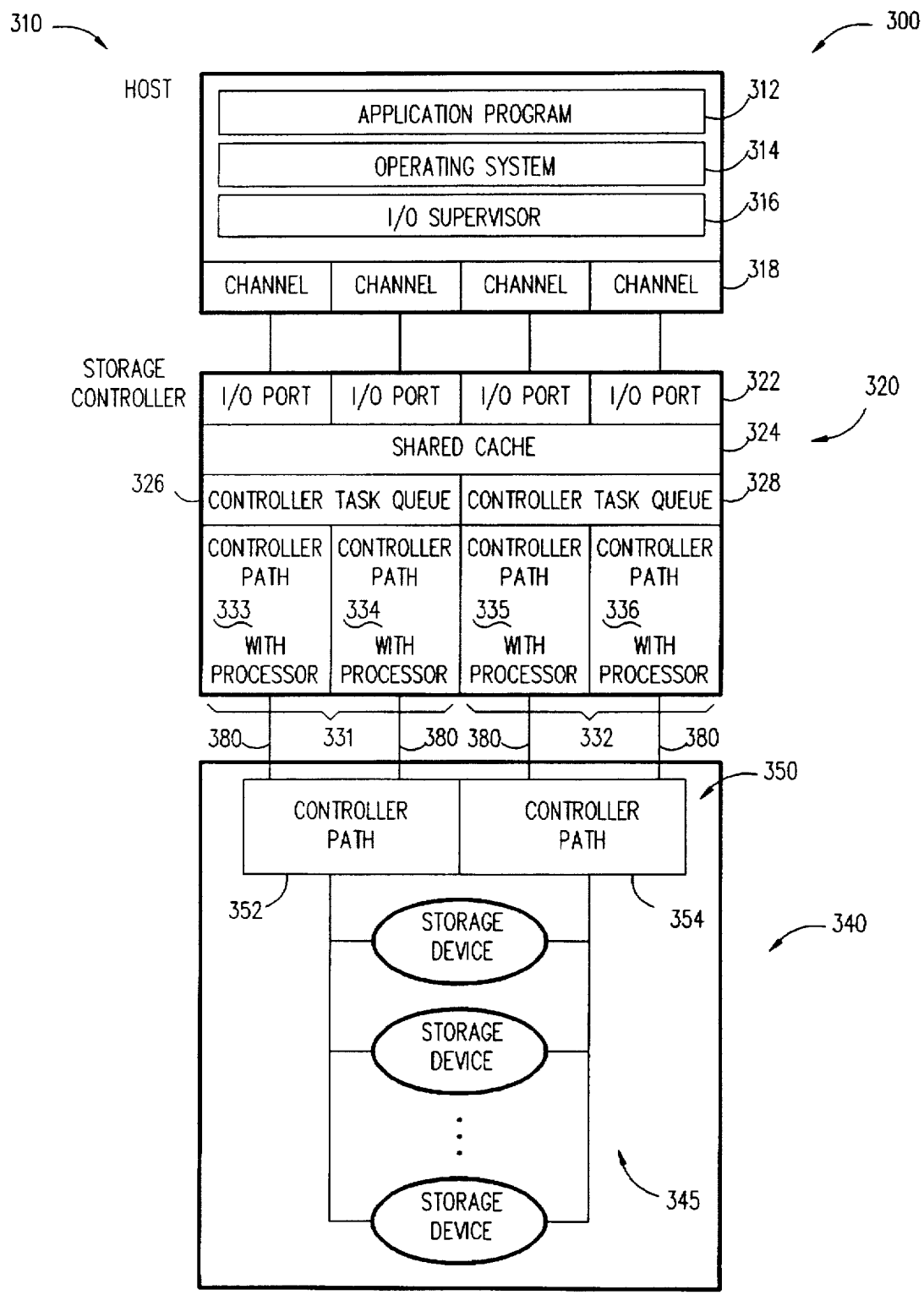
FIG. 4 is a depiction of the preferred embodiment of the present invention.

With respect to FIG. 4, there is shown the preferred embodiment of the present invention. Data processing system 300, comprises a host 310 in communication with storage controller 320, where the storage controller is in communication with storage array 340. The storage array 340 further comprises an array controller 350 which controls access to storage devices 345. In this embodiment, the storage devices that are normally attached to storage controller 320 are replaced with storage array 340. Storage array 340 then can be treated as a logical IBM 3390 storage device. That is, storage array 340 can allow attachment of standard storage devices to storage controller 320 by providing emulation of previously existing storage devices such as the IBM 3390 storage subsystem. Furthermore, array controller 350 in combination with storage devices 345 can provide extremely high data availability via architectures such as reliable arrays of inexpensive disks (RAID).

Referring back to FIG. 4, host 310 comprises an application program 312, operating system 314, an I/O supervisor 316, and a plurality of I/O channels 318 for communication with storage controller 320. Storage controller 320 generally comprises a plurality of I/O ports 322 for communication with host 310, a shared cache 324 for high performance, and two storage sub-controllers 331 and 332 for accessing storage array 340. Storage sub-controller 331 comprises a controller task queue 326 and controller paths 333 and 334. Storage sub-controller 332 comprises a controller task queue 328 and controller paths 335 and 336. Storage controller 320 communicates with storage array 340 via a plurality of communication lines 380.

Figure 5:
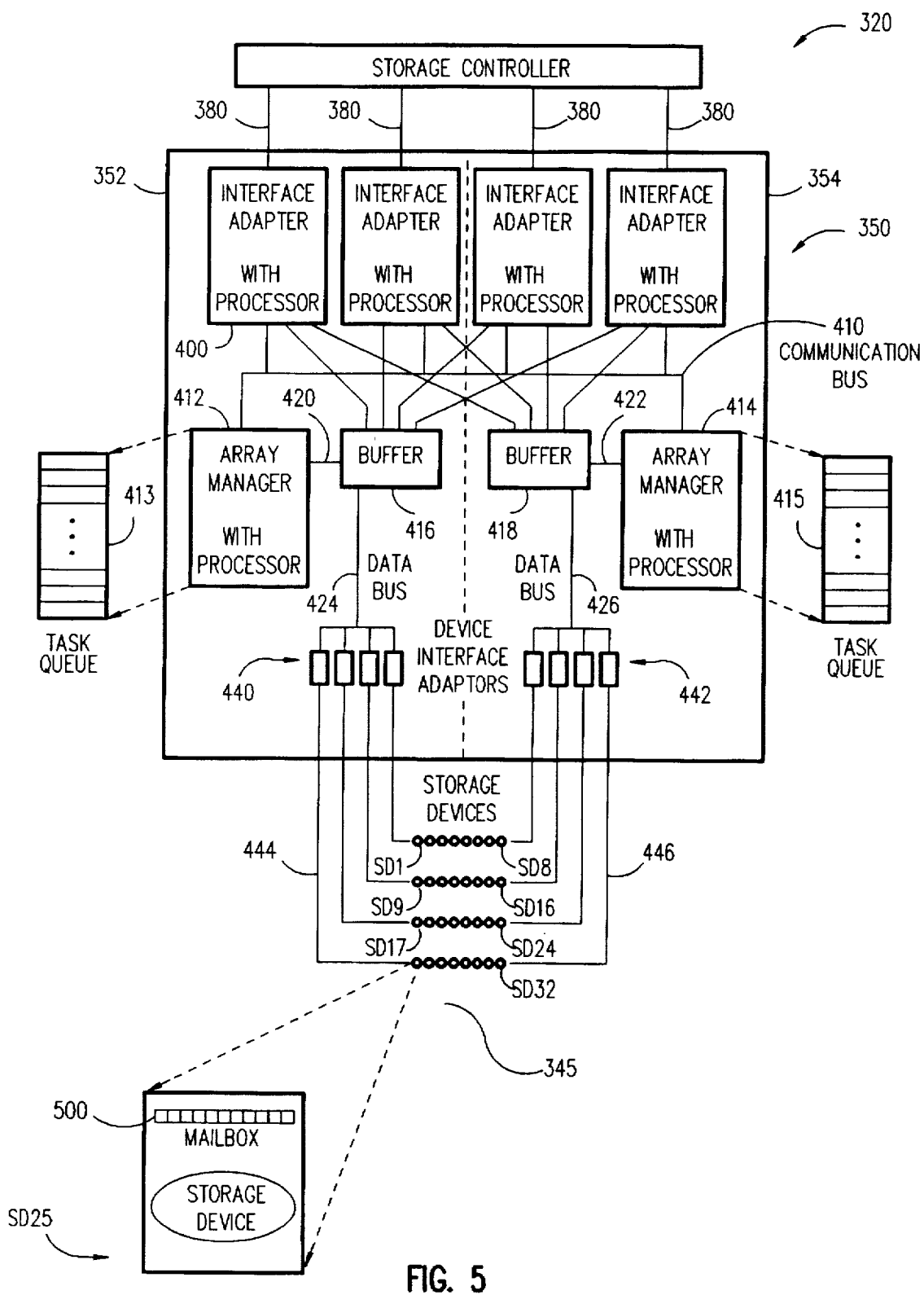
FIG. 5 is a detailed schematic diagram of the array controller shown in FIG. 4.

FIG. 5 shows the detailed schematic diagram of array controller 350 in communication with storage devices 345 and storage controller 320. Array controller 350 comprises two identical independently operating controller paths 352 and 354. Controller paths 352 and 354 together provide for enhanced performance and fault tolerant operation. In the preferred embodiment, array controller 350 is in communication with storage controller 320 over a plurality of communication links 380 (four shown in this example). Array controller 350 further comprises a plurality of storage interface adapters 400 (four shown in this example, two in each controller path). Storage interface adapters 400 receive commands (instructions, requests) for access to storage devices 345 from storage controller 320 and initially determine if a request issued by storage controller 320 can be satisfied from either buffer 416 or buffer 418. Buffers 416 and 418 store data received from the devices and the storage controller. If the request can be satisfied from the content of either buffer, that information is communicated back to storage controller 320 via one of the storage interface adapters 400. For each request that cannot be satisfied from the content of one of the buffers, one of the storage interface adapters generates a unique request identifier (also referred to as a label) and sends the request with its unique identifier to array managers 412 and 414. Array managers 412 and 414, in turn, add the request and its label to their respective queues 413 and 415.

Array managers 412 and 414 are generally responsible for managing data handling between storage controller 320 and storage devices 345. They further translate data format between storage devices 345 format (native format) and the emulated device format (the format as seen by storage controller 320). For example, the data might be stored on storage devices 345 as a fixed block format (native device format). On the other hand, storage controller 320 may be set up to handle the information in a count-key-data format. Therefore, array managers 412 and 414 provide the translation between these two different types of data formats. Each array manager further maintains its own task queue. For example, array manager 412 maintains array task queue 413 and array manager 414 maintains array task queue 415. Each array manager updates its own array task queue on the basis of messages received from any one of the storage interface adapters 400 and based on the content of the mailbox in each storage device. Array managers 412 and 414 further manage dispatching device operations to storage devices 345 via device interface adapters 440 and 442, respectively.

In the preferred embodiment, each array controller path 352 and 354 includes four device interface adapters. Array managers 412 and 414 further notify device interface adapters 440 and 442, respectively, when a request to access a device or data is available for transmission. Array managers 412 and 414 are also in communication with each other via communication bus 410 through which they may notify each other of the events that may affect the operations of their respective array controller paths 352 and 354. Array managers 412 and 414 may further include RAID exclusive OR (XOR) functions to maintain parity across storage devices 345 to ensure redundant recording of data and fault tolerant operations.

As mentioned above, device interface adapters 440 and 442 provide access to devices 345 and control storage devices' operations. Device interface adapters also provide operation status to their respective array manager. FIG. 5 further shows a plurality of storage devices 345 (32 devices shown in this example and labelled SD1 through SD32) each device having a mailbox 500. In FIG. 5, storage devices 345 are arranged in four clusters, each cluster including eight devices. Devices 345 can be accessed independently by array controller paths 352 and 354 through their respective device interface adapters 440 and 442. Each device interface adapter can access four storage devices concurrently, one from each cluster.

Figure 1:
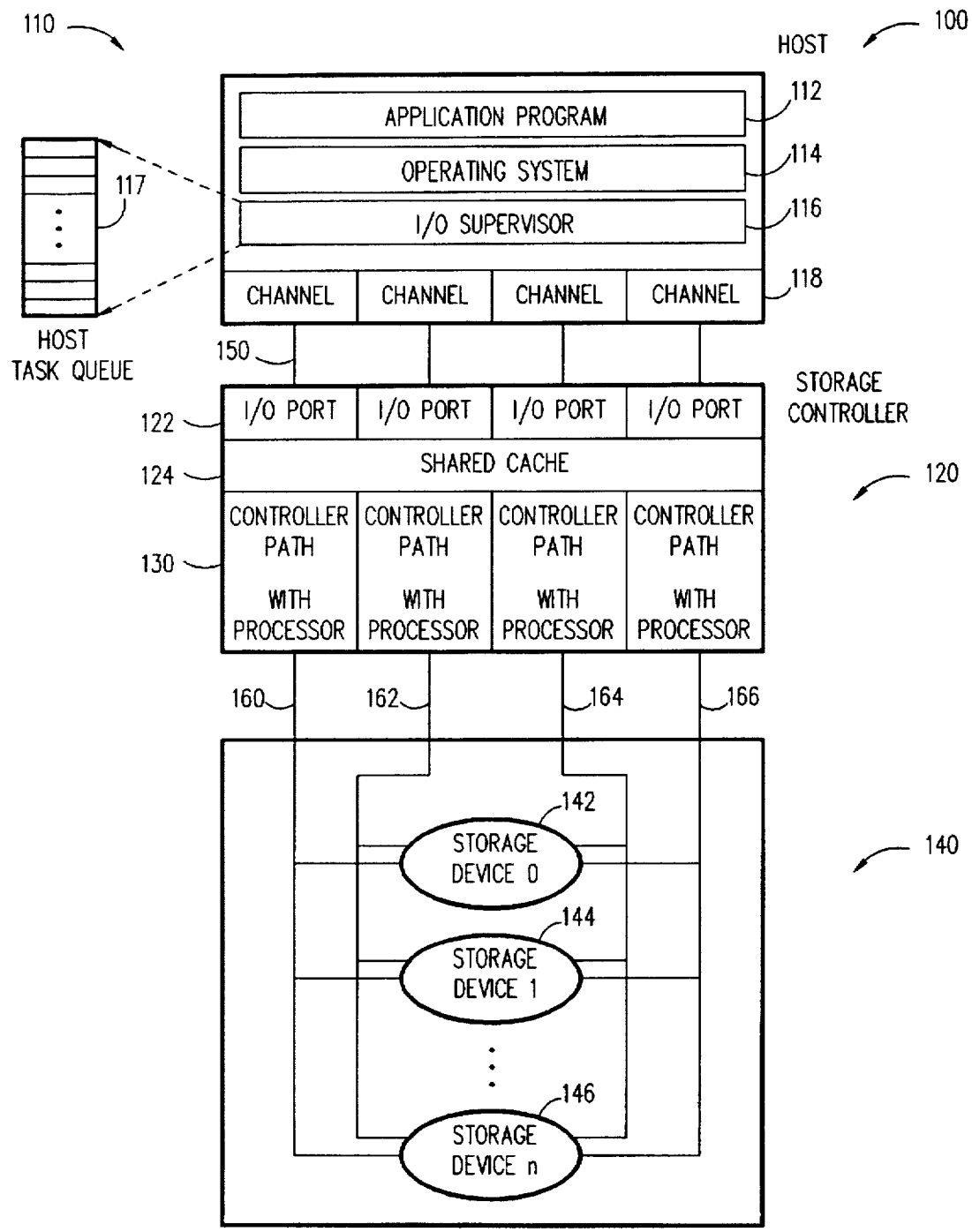
FIG. 1 is a depiction of a data processing system having a host in communication with a storage subsystem.
Figure 2:
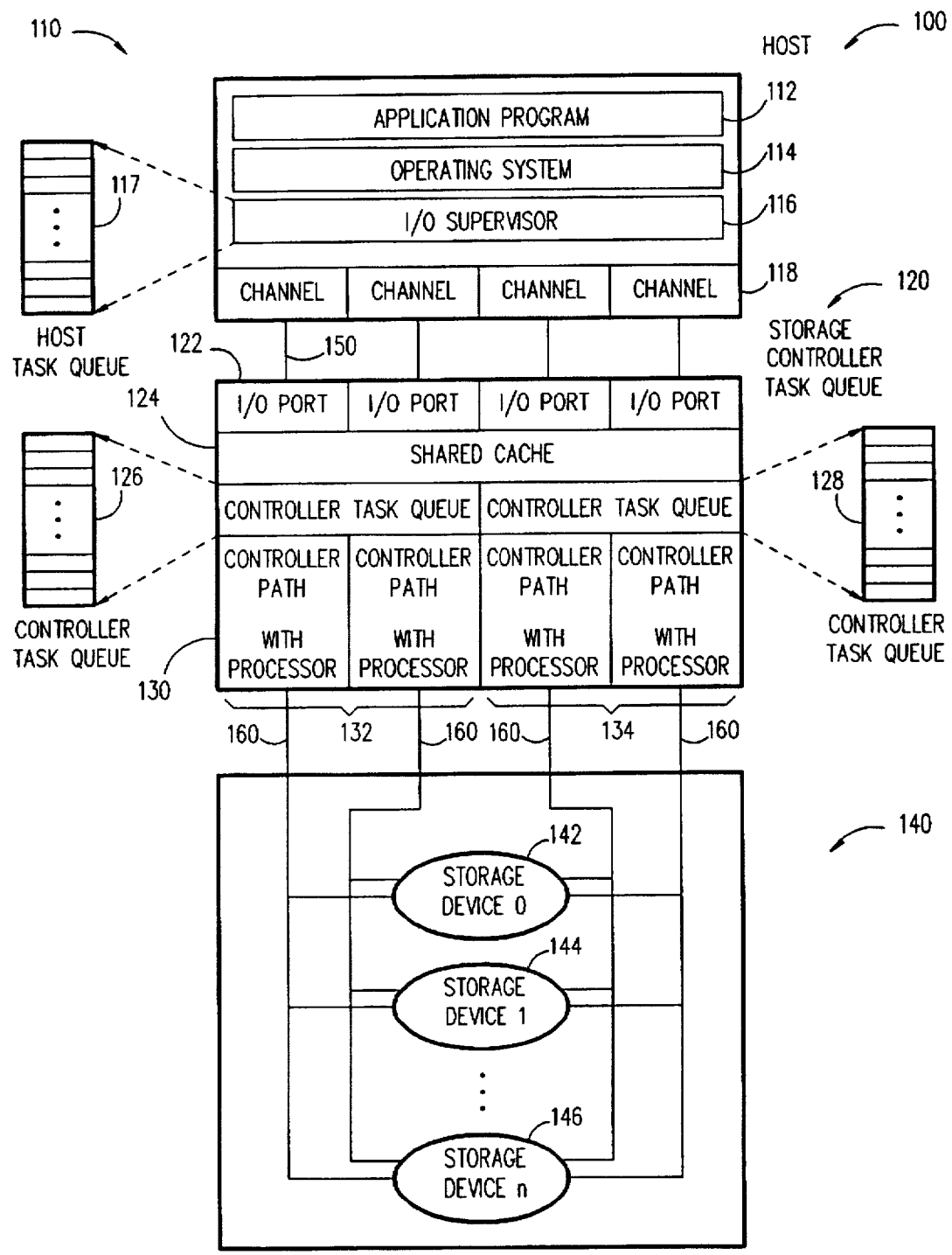
FIG. 2 is a depiction of another data processing system having a plurality of task queues at the storage controller.
Figure 3:
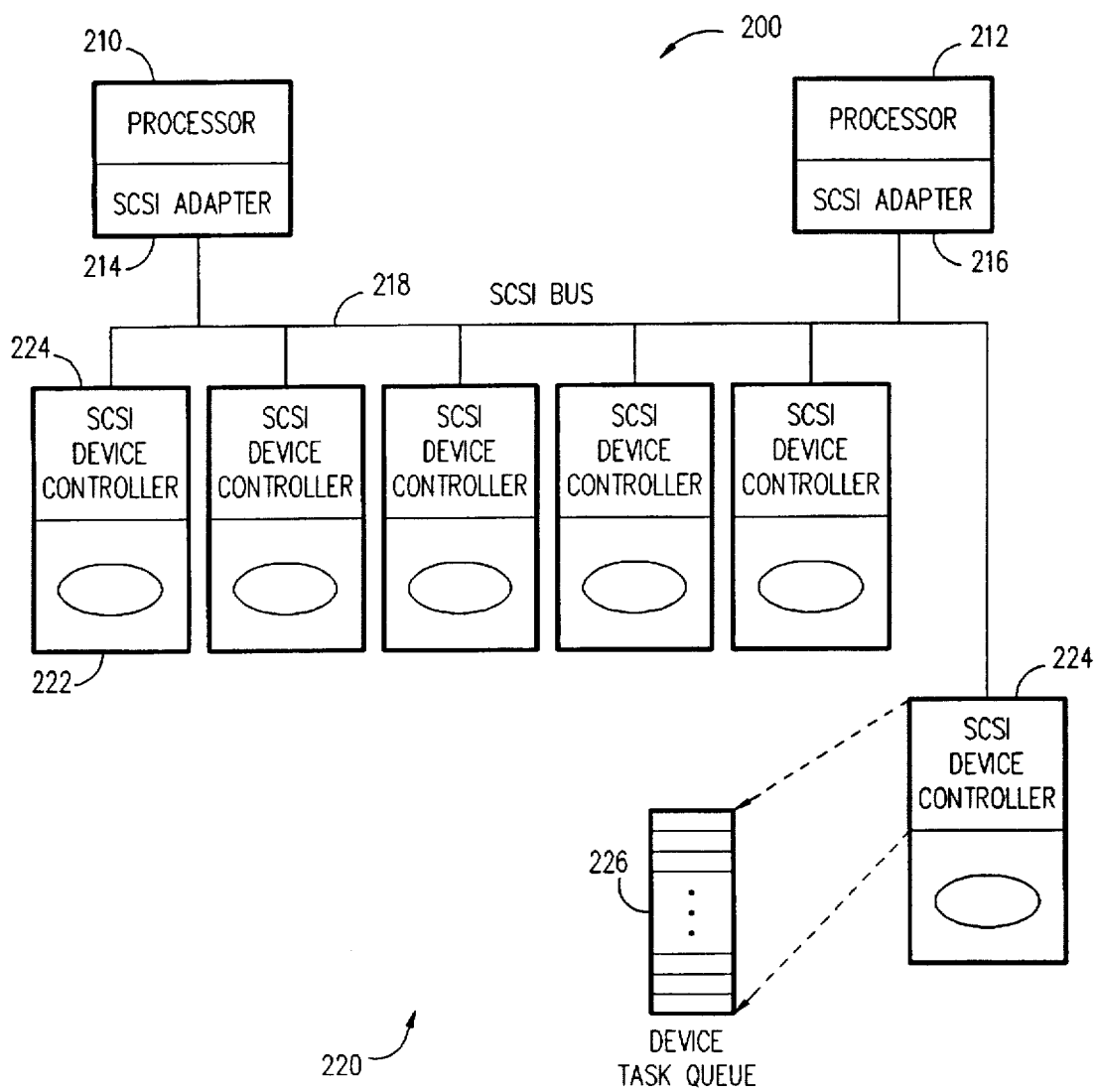
FIG. 3 is a depiction of another data processing system having a task queue in each device.
Figure 6:
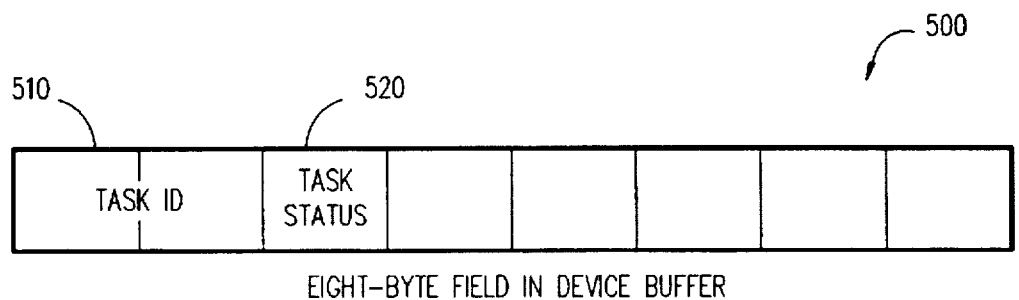
FIG. 6 is a depiction of a mailbox stored in each storage device.

With respect to FIG. 6, there is shown a representation of a device mailbox 500 maintained in each of the storage devices 345. In the preferred embodiment, mailbox 500 comprises an eight-byte field for storing the unique request ID 510 (task ID) and the status 520 (task status) of the latest request that has been received by a storage device from array controller 350. The unique request (task) IDs 510 are preferably, but not necessarily, sequential for ease of handling and operation. Mailbox 500 may also include information such as device interface adapter identification from which the request was received. Mailbox 500 may also include information such as device allegiance.

Figure 7A:
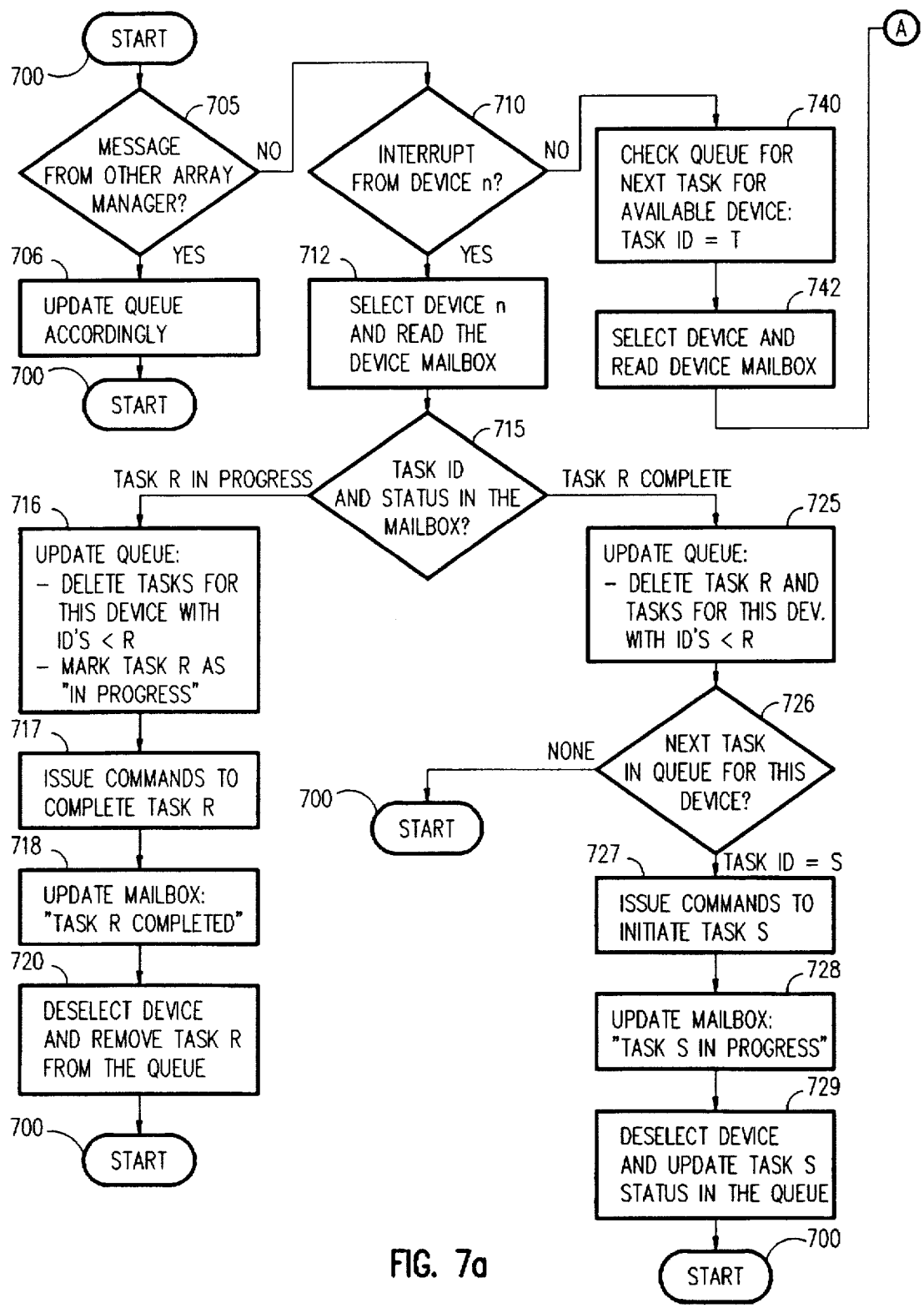
FIG. 7 is a flowchart of I/O requests handling in the preferred embodiment of the present invention.
Figure 7B:
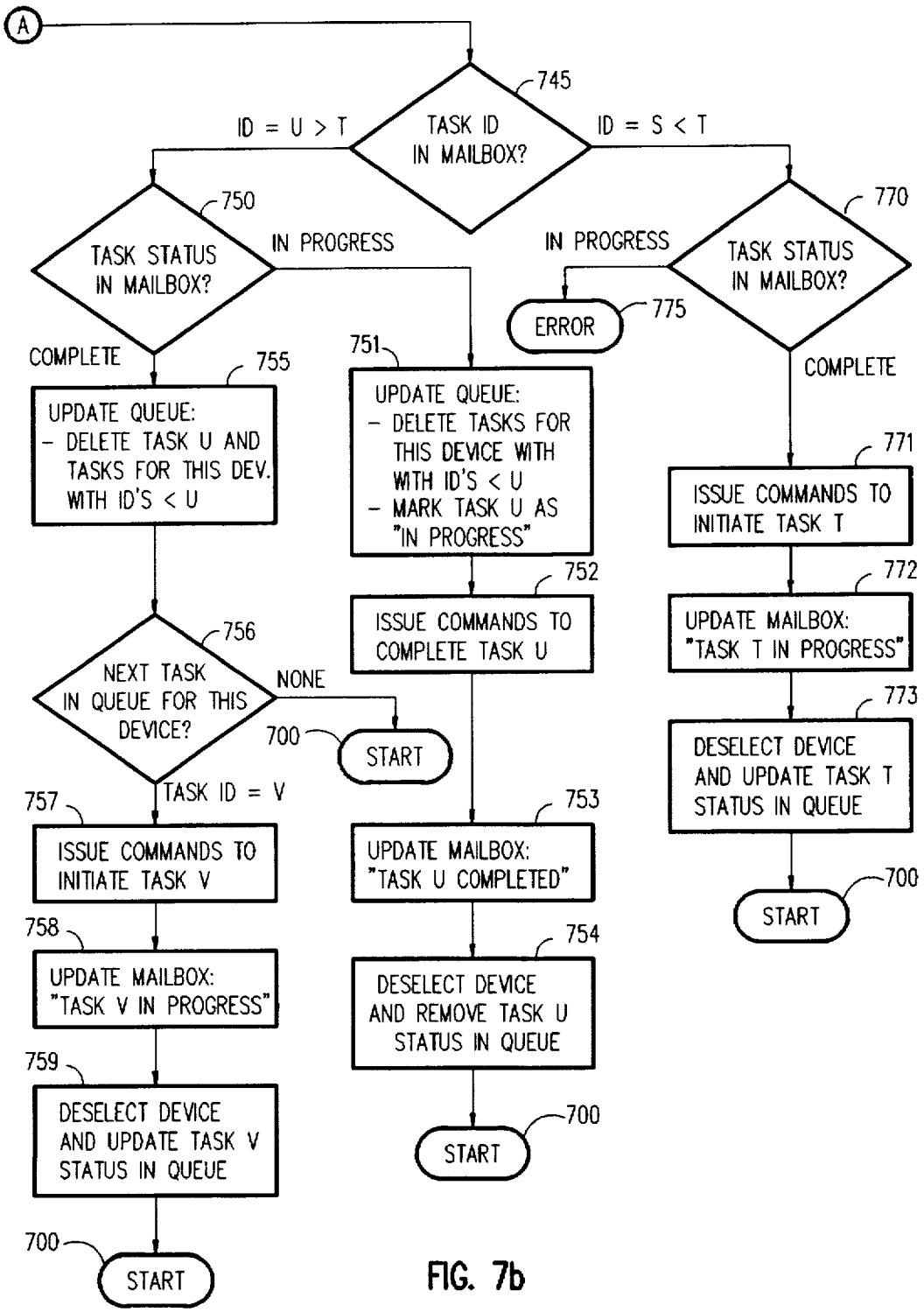

With reference to FIG. 7, there is shown a flowchart of device access and queues management operation carried out by array managers 412 and 414 in the preferred embodiment of the present invention. The operation will be described with respect to array manager 412 although it is as applicable to array manager 414.

Array manager 412 initially determines whether any message with respect to queues' status has been received from array manager 414 via communication bus 410 (block 705). Array task queue 413 is updated accordingly if such a message is received (block 706) otherwise array manager 412 determines whether an interrupt from any of the devices 345 has been received (block 710). If a device interrupt from device n is received, device n is selected and its mailbox is read to determine what is the task ID (request ID) and the status of the latest request dispatched to device n (blocks 712 and 715). Assume that the content of mailbox register indicates that the task with unique sequential ID "R" (referred to simply as task "R") is in progress. Array manager 412 then updates array task queue 413 and deletes all the requests having unique sequential ID less than "R" and updates queue 413 to reflect that task "R" is in progress (block 716). Array manager 412 then issues a command to device n to complete task "R" (block 717) and at the same time updates the mailbox in device n to post "task R complete" (block 718). Array manager 412 then deselects device n and deletes task "R" from its array task queue 413 (block 720).

Referring back to block 715, if the content of mailbox register in device n indicates that the task "R" has been completed, array manager 412 then updates array task queue 413 by deleting task "R" and all the requests having unique sequential ID less than "R" (block 725). Array manager 412 then checks array task queue 413 to determine if there is any other tasks in the queue for device n (block 726); if there is none, the operation returns to block 700; if there is a task "S" for device n, array manager 412 issues commands to initiate task "S" execution (block 727), the mailbox is updated to reflect that task "S" is in progress (block 728), and device n is deselected and the status of task "S" in queue 413 is updated (block 729).

Returning back to block 710, if array manager 412 does not receive an interrupt from any device, it then checks queue 413 to determine what is the next task that should be carried out and for what device (block 740). Assume that the next task to be carried out by array manager 412 according to its queue 413 is task "T" for device n. Array manager 412 then issues commands to select device n and read its mailbox to determine the ID and the status of the latest task that was issued to device n (block 742). If the task ID in device n mailbox is less than "T" (block 745) and its status is in progress (block 770), then an error has occurred and the error is communicated back to array manager 412 (block 775). If the task ID in device n mailbox is less than "T" (block 745) and its status is complete, array manager issues commands to initiate task "T", updates the mailbox for device n to show that task "T" is in progress, and then deselects and updates the status of task "T" in array task queue 413 (blocks 771, 772, and 773).

If the task ID in device n mailbox is "U" which is greater than "T" (block 745) and the status of task "U" is complete, array manager 412 deletes tasks "T" and "U" from queue 413 (block 755) and determines if there is any other task in queue 413 for device n (block 756); if there is none, the operation returns to block 700; if there is a task "V" in queue 413 for device n, array manager 412 issues commands to initiate task "V" execution (block 757), the mailbox is updated to reflect that task "V" is in progress (block 758), and device n is deselected and the status of task "V" in queue 413 is updated (block 759).

If the task ID in device n mailbox is "U" which is greater than "T" (block 745) and the status of task "U" is "in progress", array manager 412 then updates array task queue 413 and deletes all the tasks (requests) having task IDs less than "U" and updates queue 413 to reflect that task "U" is in progress (block 751). Array manager 412 then issues a command to device n to complete task "U" (block 752) and at the same time updates the mailbox in device n to post "task U complete" (block 753). Array manager 412 then deselects device n and deletes task "U" from its array task queue 413 (block 754).

Now referring generally to FIGS. 4 through 7, the operation of task queues 413 and 415 and the use of the mailbox will be further explained with the following example. Assume task queue 413 contains unique sequentially numbered requests 25 and 26 for storage device 8 (SD8). The request 25 is at the top of the queue (which means it is the next operation to be carried out). Array manager 412 then issues a command through device interface adapter 440 to see whether storage device 8 is available or is busy. If storage device 8 is busy, that information is communicated back to array manager 412 which may then decide to carry out requests for other devices before making another attempt for communication with storage device 8. On the other hand, if storage device 8 is available, array manager 412 selects device 8 and immediately reads mailbox 500 in storage device 8 to determine what is the status of the last request that was carried out by storage device 8. If mailbox 500 shows that the last request that was completed was request number 24, then array manager 412 issues the seek/locate command to storage device 8 for request 25. It then updates the mailbox to show that request 25 is in progress. This is done by setting task status 520 at p (where p stands for "in progress"). Array manager 412 then deselects storage device 8, updates queue 413 to show that request 25 is in progress. Array manager 412 may also send a message to array manager 414 via communication bus 410 informing array manager 414 that request 25 is in progress. Array manager 412 then may return to an idle state or establish communication with the other devices.

On the other hand, if array manager 412 selects storage device 8 and after reading mailbox 500 finds out that the seek/locate command for request 25 is already in progress, array manager 412 updates queue 413 to show that request 25 is in progress, it then issues commands to device 8 to complete request 25, updates the mailbox to reflect the change in the status, and deselects storage device 8 and deletes request 25 from queue 413.

Alternatively, if array manager 412 establishes a communication link with device 8 in order to execute request 25 and after reading device 8 mailbox finds out that the seek/locate is already in progress for request 26, array manager 412 will then conclude that request 25 has already been completed by array manager 414. Array manager 412 then deselects storage device 8 and deletes request 25 from queue 413. It also updates queue 413 to show that request 26 is in progress and then returns to an idle state.

On the other hand, if array manager 412 attempts to carry out request 25 for storage device 8 and finds out, by reading mailbox 500, that request 26 has already been completed, array manager 412 will then conclude that request 25 has already been completed and that both requests 25 and 26 have been serviced by array manager 414. Array manager 412 then deletes both requests 25 and 26 from queue 413 and then searches queue 413 to determine whether there are any other requests in queue 413 for device 8. If such a request is found, then it will attempt to carry it out. If no such request for storage device 8 is found, it deselects storage device 8 and it searches queue 413 for requests for other devices.

Therefore, based on the detailed description and the examples provided, it can readily be appreciated that servicing a request having a plurality of sub-commands (two, three or more 26 sub-commands) may be initiated by one array manager using the information in its own respective array task queue and the same request may be further carried out or completed by another array manager. It can also readily be appreciated that several requests which are present in both the array task queues may be serviced by only one of the array managers without the other array manager ever having time to participate in such servicing.

However, using a mailbox register at each storage device provides an easy and efficient way to provide the status of each request to each array manager in an array controller. Thus, queues in each controller path could be completely out of sync with each other without creating any data integrity problems or a potential for duplicating the same request. Through the use of unique request labeling in conjunction with a mailbox at each register, the status of each request (complete, progress, waiting in the queues) can be communicated between the array managers without the need for a separate high speed communication link or without the need for a complex locking scheme to ensure that the array task queues are in sync at all times.

Figure 8:
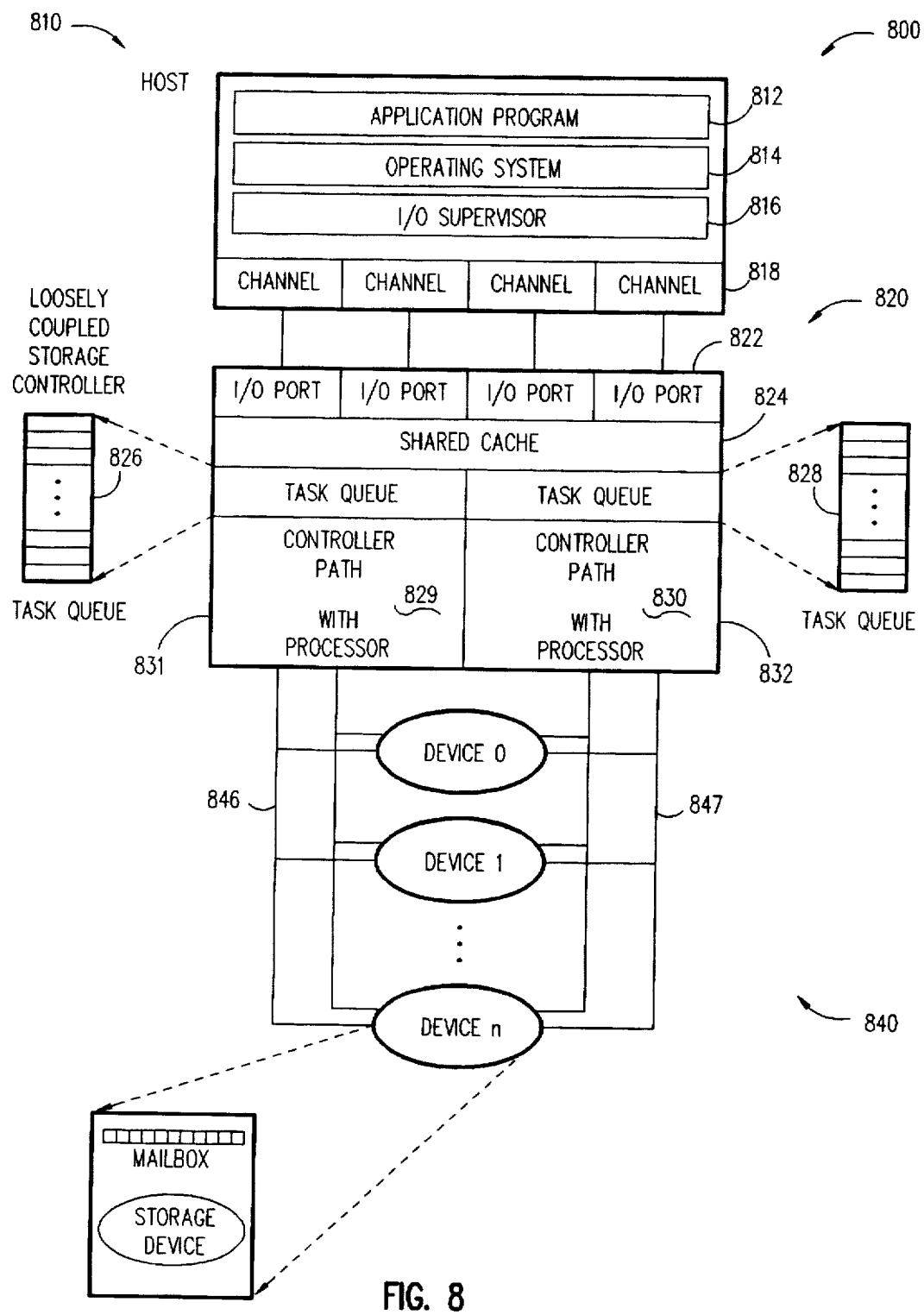
FIG. 8 is a depiction of an alternative embodiment of the present invention.

FIG. 8 shows an alternative embodiment of the present invention. Data processing system 800 comprises a host 810 in communication with storage controller 820 where the storage controller is in direct communication with storage devices 840. In this embodiment, unlike the preferred embodiment shown in FIGS. 4 and 5, storage controller 820 directly controls access to devices 840. Host 810 comprises application programs 812, operating system 814, I/O supervisor 816 and a plurality of communication channels 818.

Storage controller 820 comprises a plurality of I/O ports 822 for communication with host 810, a shared cache 824, and two storage sub-controllers 831 and 832. Storage sub-controller 831 comprises a task queue 826 and controller path 829. Storage sub-controller 832 comprises a task queue 828 and controller path 830. Each controller path further comprises a processor and a memory unit. Storage sub-controllers 831 and 832 are in communication with storage devices 840 via communication channels 846 and 847. Each of the storage devices 840 comprises a mailbox which stores the unique ID and the status of the latest request carried out by each of the storage devices. The process of accessing the devices, reading the mailboxes, and managing the task queues by the storage sub-controllers are similar to the one for the preferred embodiment of the present invention. Note that in this embodiment, task queues 826 and 828 could be completely out of sync with each other without slowing down system operation, without causing data integrity problem or without causing duplication of requests.

Figure 9:
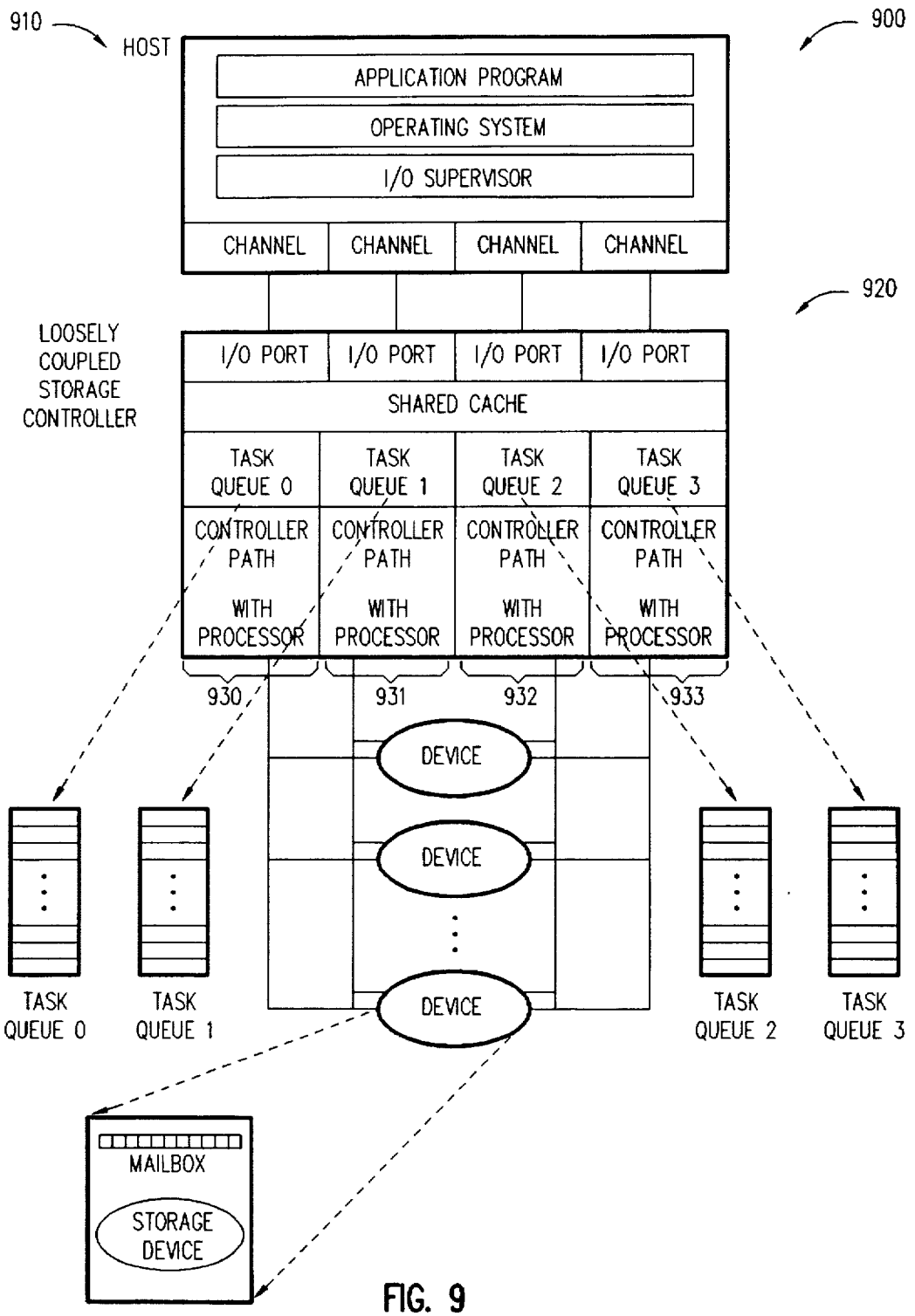
FIG. 9 is a depiction of another alternative embodiment of the present invention; and, FIG. 10 is a depiction of another alternative embodiment of the present invention.

FIG. 9 is a depiction of another alternative embodiment of the present invention similar to the embodiment shown in FIG. 8. In this alternative embodiment, data processing system 900 comprises a storage controller 920 where the storage controller comprises four storage sub-controllers 930, 931, 932, and 933. Each storage sub-controller further has its own task queue. Therefore, in this embodiment, there are four task queues in the storage controller that may service requests issued by host 910. Using the disclosed invention, the task queues could be completely out of sync with each other without creating data integrity problems, duplication of requests at the device level or complicated locking schemes for the queues.

Figure 10:
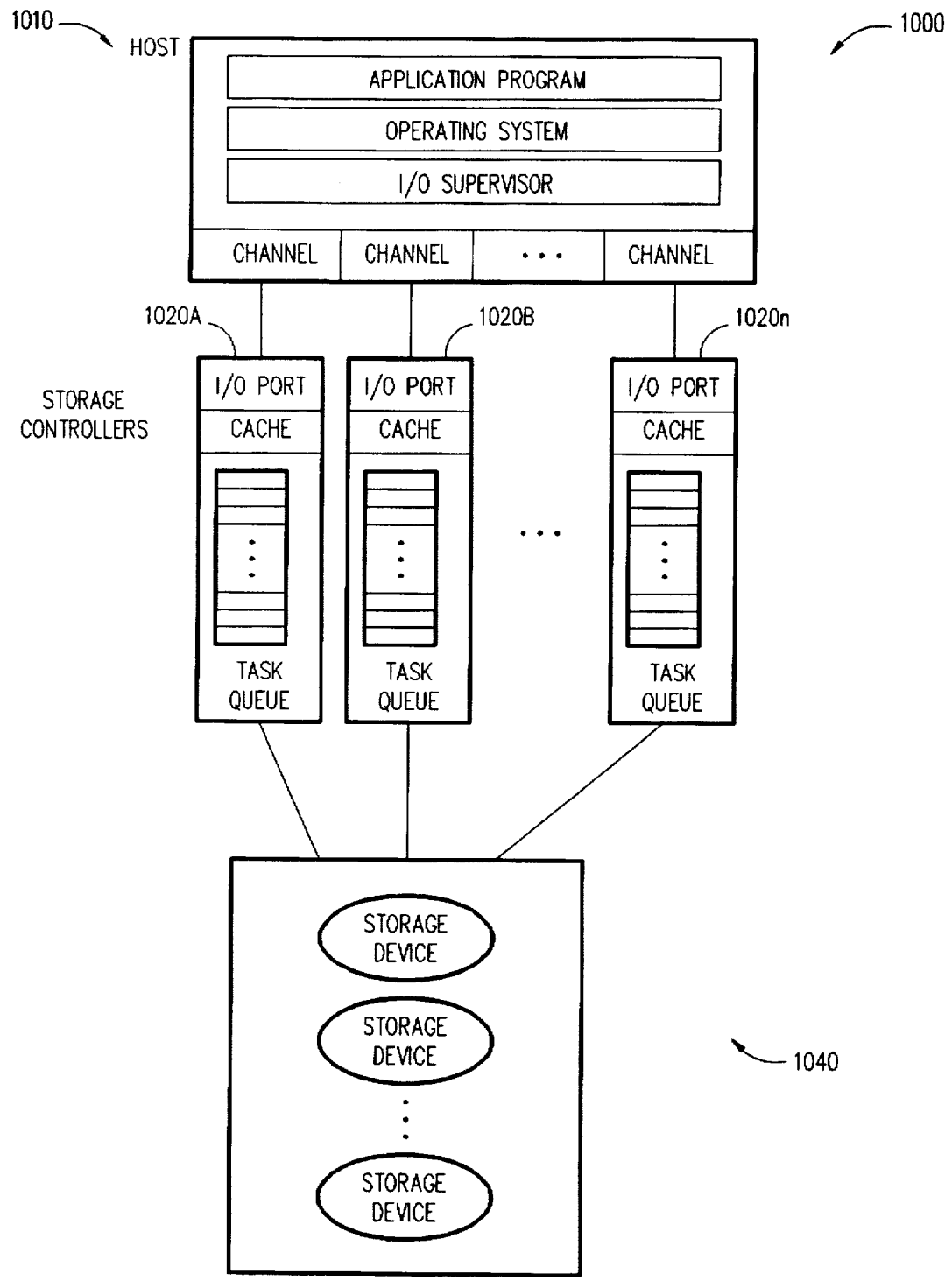

FIG. 10 is a depiction of another alternative embodiment of the present invention where a host may communicate with storage devices via a plurality of storage controllers connected together in a network. In this alternative embodiment, data processing system 1000 comprises a host 1010, a plurality of storage controllers 1020A, 1020B, . . . , and 1020N, and storage devices 1040. Each storage controller comprises a cache and may also comprise one or more storage sub-controllers where each storage sub-controller has its own task queue. Therefore, in this embodiment, a host 1010 request is sent to two or more controllers for processing. The unique task ID of the request is preferably, but not necessarily, generated by host 1010 at the same time that the request is generated and sent to the controllers. If the request cannot be processed from the information already stored in and of the caches, it will be stored in the task queues and will be processed by accessing storage devices 1040 in a manner similar to the preferred embodiment of the present invention. Using the disclosed invention, the task queues in different controllers could be completely out of sync with each other without creating data integrity problems, duplication of requests at the device level or complicated locking schemes for the queues.

A number of embodiments of the present invention have been described. Nevertheless, it will be understood that various modifications may be made without departing from the spirit and the scope of the invention. For example, the number of task queues may be any number without imposing any limitation on the invention disclosed herein. The mailbox may be expanded to keep additional information such as the history of the past n requests handled by any device and which path initiated or completed the requests. The mailbox may further include information such as aborted requests and whether the device access is limited to a specific path. Accordingly, it is to be understood that the invention is not to be limited by the specific illustrated embodiments, but only by the scope of the appended claims.

We claim:

1. A data processing system, comprising:
a central processing unit (CPU);
a storage subsystem in communication with said CPU, said storage subsystem including:
a storage controller having a plurality of storage sub-controllers, each of said storage sub-controllers comprising a queue, said queues concurrently storing requests received from said CPU, each of said requests having a unique identification label; and,
a storage device for servicing requests received from said queues, said storage device comprising a mailbox for storing the status and the unique identification of each request being serviced.

2. A data processing system as recited in claim 1, wherein each request comprises a plurality of sub-commands.

3. A data processing system as recited in claim 2, wherein said mailbox further comprises a status field for storing the status of each sub-command being executed.

4. A data processing system as recited in claim 3 further comprising means for reading said mailbox and updating the status of the requests in said queues based on the content of said mailbox.

5. In a data processing system, comprising a host and a storage subsystem where said storage subsystem includes a storage controller and a storage device for processing requests received from the host and where said storage controller includes a plurality of storage sub-controllers, each of said storage sub-controllers including a queue, a method of updating the status of each of said queues, comprising the steps of:
assigning a unique identification label to each request concurrently stored in said queues;
maintaining a mailbox in said storage device for storing the status of each request being serviced;
reading said mailbox to determine the status of the last request being serviced; and,
updating said queues based on the content of the mailbox.

6. A data processing system as recited in claim 5, wherein each request stored in said queues comprises a plurality of sub-commands.

7. A data processing system as recited in claim 6, wherein said mailbox comprises a status field for storing the status of each sub-command being executed.

8. A data processing system, comprising:

a central processing unit (CPU);

a storage subsystem in communication with said CPU, said storage subsystem including:
- a storage controller having a plurality of storage sub-controllers, each of said storage sub-controllers comprising a queue, said queues storing each request received from said CPU, each request having a unique identification label; and
- a storage device for servicing said each request, said storage device comprising a mailbox for storing the status and the unique identification of said each request being serviced, the information stored in said mail box being used to update said queues.

9. A data processing system, comprising:

a central processing unit (CPU);

a storage device;

a storage controller in communication with said CPU and said storage device, said storage controller including:
- a plurality of storage sub-controllers, each of said storage sub-controllers comprising a queue, said queues concurrently storing each request received from said CPU for accessing said storage device, said each request having a unique identification label; and, said storage device servicing requests received from said queues, said storage device comprising a mailbox for storing the status and the unique identification of only the request being serviced, the status of the request being serviced being used to update said queues.

10. In a data processing system, comprising a host and a storage subsystem where said storage subsystem includes a storage controller and a storage device for processing requests received from the host for accessing said storage device and where said storage controller includes a plurality of storage sub-controllers, each of said storage sub-controllers including a queue for storing each request issued by the host for access to said storage device, a method of updating the status of each of said queues, comprising the steps of:

assigning a unique identification label to each request issued by the host for access to said storage device;

storing said each request in said queues;

maintaining a mailbox in said storage device for storing the status and unique identification label of only the request being serviced;

reading said mailbox to determine the status of the request being serviced by said storage device; and, updating said queues based on the content of the mailbox.

11. A data processing system, comprising:

a central processing unit (CPU);

a storage device;

a storage controller in communication with said CPU, said storage controller including:
- a plurality of storage sub-controllers, each of said storage sub-controllers comprising a queue, said queues storing each request received from said CPU for accessing said storage device, each request having a unique identification label; and said storage device servicing requests received from said queues, said storage device comprising a mailbox for storing the status and the unique identification of the request being serviced, the information stored in said mailbox being used to update said queues asynchronously.

* * * * *